Oct. 4, 1932.   C. G. DIETSCH   1,880,880
NOZZLE
Filed June 4, 1930
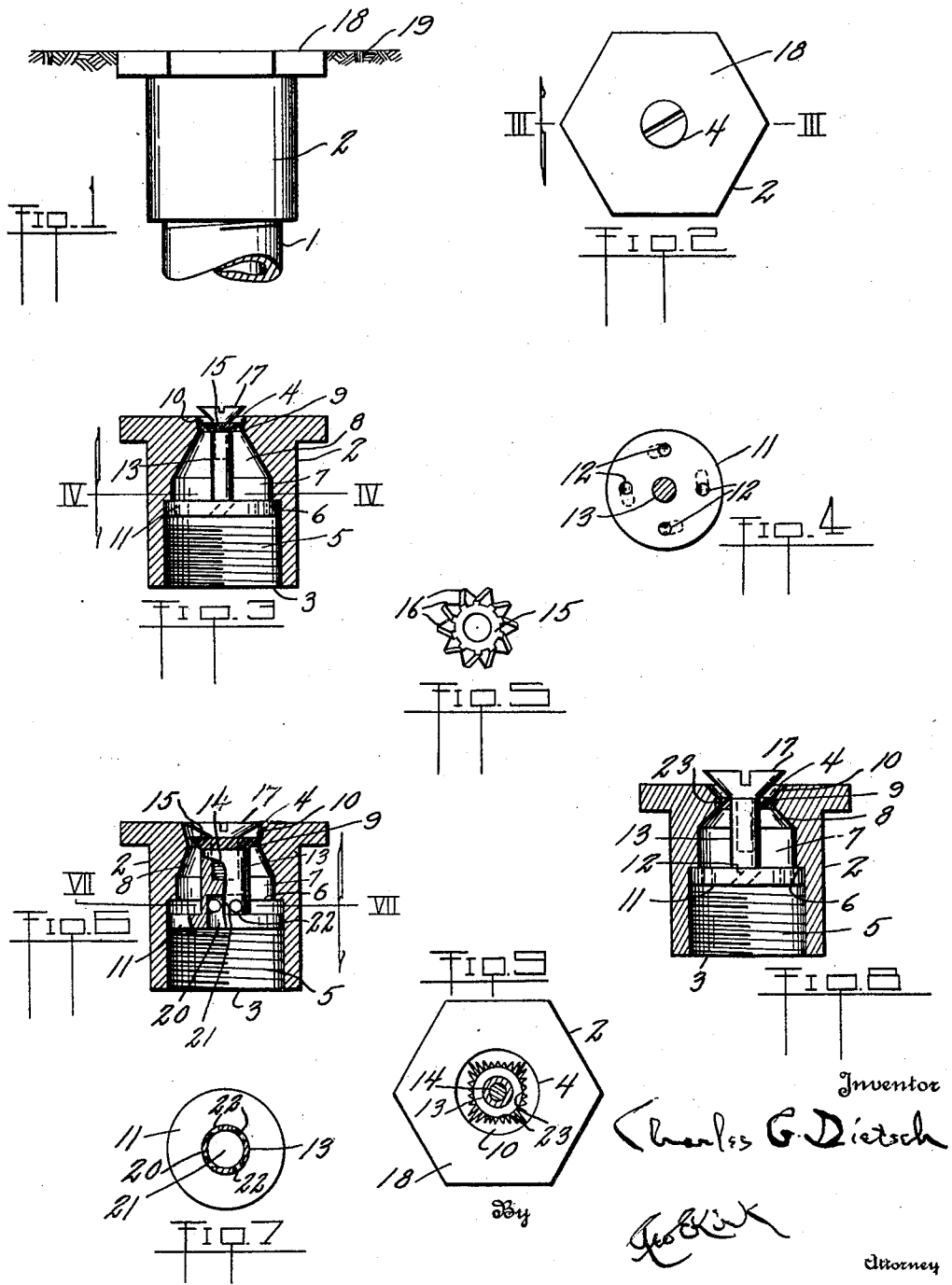
Inventor
Charles G. Dietsch
By
Geo E Kirk
Attorney Patented Oct. 4, 1932

1,880,880

UNITED STATES PATENT OFFICE

CHARLES G. DIETSCH, OF TOLEDO, OHIO

NOZZLE

Application filed June 4, 1930. Serial No. 459,247.

This invention relates to liquid dispersion.

This invention has utility when incorporated in nozzles, more particularly of the lawn sprayer type.

Referring to the drawing:

Fig. 1 is a side elevation of a nozzle embodying the invention herein;

Fig. 2 is a plan view of the nozzle of Fig. 1;

Fig. 3 is a view on the line III—III, Fig. 2;

Fig. 4 is a view on the line IV—IV, Fig. 3;

Fig. 5 is a bottom plan view of the toothed dispersing member;

Fig. 6 is a longitudinal cross-section of a modified construction of nozzle;

Fig. 7 is a view on the line VII—VII, Fig. 6;

Fig. 8 is a longitudinal cross-section of an additional modified construction of nozzle; and Fig. 9 is a plan of the nozzle of Fig. 8, parts being broken away.

Mounted on liquid supply line 1 is head 2 having threaded connection therewith. Liquid flowing from the line 1 enters passageway 3 to flow through the head 2 to be discharged from orifice 4.

The passageway 4 has liquid entrance portion 5, a part of which is threaded for engaging the line 1. The portion 5 terminates at an annular shoulder or seat 6 from which extends portion 7 having tapered portion 8 extending therefrom to terminate in throat 9. From the throat 9 extends comparatively short outwardly tapered portion 10 terminating in the orifice 4.

The portions 8 and 10 each taper toward the throat 9, the inwardly extending taper of the portion 10 being slight.

Disposed in the portion 5 is movable partition 11 having a series of ports 12 therethrough inclined as to the longitudinal axis of the nozzle. The partition 11 is forced against the seat 6 by the flow of liquid therethrough and drops by gravity away from the seat when the flow is stopped.

The partition 11 has axially extending stem 13 extending therefrom toward the orifice 4. Screw 14 is threaded axially into the end of the stem remote from the partition to mount wheel 15 having an annular series of axially pitched beveled teeth 16. The head 17 of screw 14 holds the wheel on the stem and also serves as a baffle as well as a closure for the orifice when the partition is dropped away from the seat 6. In orifice closing position, the head 17 engages the portion 10 as a seat therefor.

A liquid entering the passage 3 passes through the ports 12 where it is given a swirling motion through the remainder of the passageway. As the liquid is passing therethrough, the partition is lifted against the seat 6 holding the toothed wheel 15 in the passageway portion 10 just above the throat 9 and adjacent the orifice 4. The swirl is there divided into a series of small streams, by the teeth 16, which are discharged through the orifice and strike the baffle 17 causing the streams to break up into a fine swirling mist.

Ordinarily the screw is tightened to hold the wheel 15 against rotation. However, the screw may be loosened so that the wheel may rotate and thereby add to the swirling motion of the liquid.

The portion 10 tapering outwardly toward the orifice 4 permits ready removal of any foreign matter by action of the liquid passing therethrough.

The nozzle may be buried in a lawn or garden so that the upper face 18 thereof may be flush with the ground level 19 permitting cultivating tools to pass thereover without interference therewith. The baffle immediately closes the orifice 4 when the liquid is shut off and prevents foreign matter from dropping into the nozzle.

In a modified construction of the nozzle, the ports 12 through the partition may be combined into a single opening 20 centrally therethrough extending to chamber 21 in the stem 13 which has ports 22 extending tangentially through the wall thereof into the portion 6 of the passageway.

The portions 6, 7, 8, and 10 as well as the throat 9 may be of various dimensions as well as the wheel 15 and the baffle 17 according to the size and style of discharge desired.

Teeth 23 may be cut into the throat 10 in place of providing a wheel 15 as shown in Figs. 8 and 9. These teeth may be axially pitched to any desired angle. Furthermore, they may be graduated about the throat so that a defined area may be reached by the spray therefrom. In the instance wherein it is desired to spray a square area, the teeth may be graduated as shown in Fig. 9. The nozzles may be so distributed over a large area that the entire plot may be reached at one time from a single source of supply.

Generally the pitch of the ports 12 is in the same direction and approximates the same angle of pitch as the teeth 15 or 23.

What is claimed and it is desired to secure by United States Letters Patent is:

1. A liquid spraying nozzle comprising a head having a discharge orifice, a passageway through said head leading to the orifice, a partition in said passageway provided with ports inclined as to the axis of the head to impart a swirl to a liquid passing through the passageway, an annular series of teeth in the passageway adjacent said orifice to break the swirl into a series of small streams, and a baffle adjacent the orifice against which the streams strike after discharge therefrom to break the streams into a mist.

2. A liquid spraying nozzle having a discharge orifice provided with an annular graduated series of axially pitched teeth extending thereinto.

3. A liquid spray nozzle comprising a member having a passageway therethrough, said passageway having a restriction intermediate its length forming a throat, an annular series of teeth carried by said member at the throat and extending thereinto, a partition movable in said passageway provided with ports therethrough from which liquid is discharged from one side to the other in an inclined direction as to the axis of the passageway, a stem extending from said partition through said throat, and a baffle carried by said stem on the side of the throat opposite from the partition.

4. A nozzle comprising a member having a passageway therethrough terminating in an orifice, a baffle disposed in said member having a stem extending therefrom along the passageway, a screw extending from the stem to have its head form a deflector adjacent the orifice, and a wheel mounted by the screw within the passageway, said wheel providing an annular series of axially pitched teeth.

In witness whereof I affix my signature.

CHARLES G. DIETSCH.